United States Patent
Chikama

[11] 3,730,632
[45] May 1, 1973

[54] ENDOSCOPE PROVIDING AN IMAGE OF AN OBSERVED OBJECT AND A SCALE BY WHICH THE TRUE SIZE OF THE OBJECT CAN BE DETERMINED FROM THE IMAGE

[75] Inventor: Toshio Chikama, Tokyo, Japan

[73] Assignee: Kabushiki Kaisha Machida Seisakusho, Tokyo, Japan

[22] Filed: June 25, 1971

[21] Appl. No.: 156,701

[30] Foreign Application Priority Data

June 26, 1970   Japan..................................45/55190

[52] U.S. Cl. ........................356/156, 356/164, 356/3, 350/96, 128/6
[51] Int. Cl. ..............................................G01b 11/00
[58] Field of Search......................356/156, 164, 166, 356/171, 168; 128/6

[56] References Cited

UNITED STATES PATENTS

| | | |
|---|---|---|
| 3,010,357 | 11/1961 | Hirschowitz..............................128/6 |
| 3,091,235 | 5/1963 | Richards...................................128/6 |
| 3,561,432 | 2/1971 | Yamaki et al. ............................128/6 |
| 3,413,067 | 11/1968 | Froio..........................................128/6 |

*Primary Examiner*—Ronald L. Wibert
*Assistant Examiner*—Paul K. Godwin
*Attorney*—Eric H. Waters et al.

[57] ABSTRACT

An endoscope is provided with apparatus for indicating the actual size of an observed object, the apparatus comprising a scale indicating portion in which the length of a bright or shaded portion is varied by movement of a shading plate in correspondence with relative movement effected between an object lens housing and an image conducting member to form a sharp image on an image viewing surface of the image conducting member. The indicating portion is adjacent the image viewing surface and the length of the bright or shaded portion represents a predetermined dimension, e.g. 10 mm and by comparing the size of the actual image of the object to the length of the bright or shaded portion, the actual size of the object can be determined.

10 Claims, 10 Drawing Figures

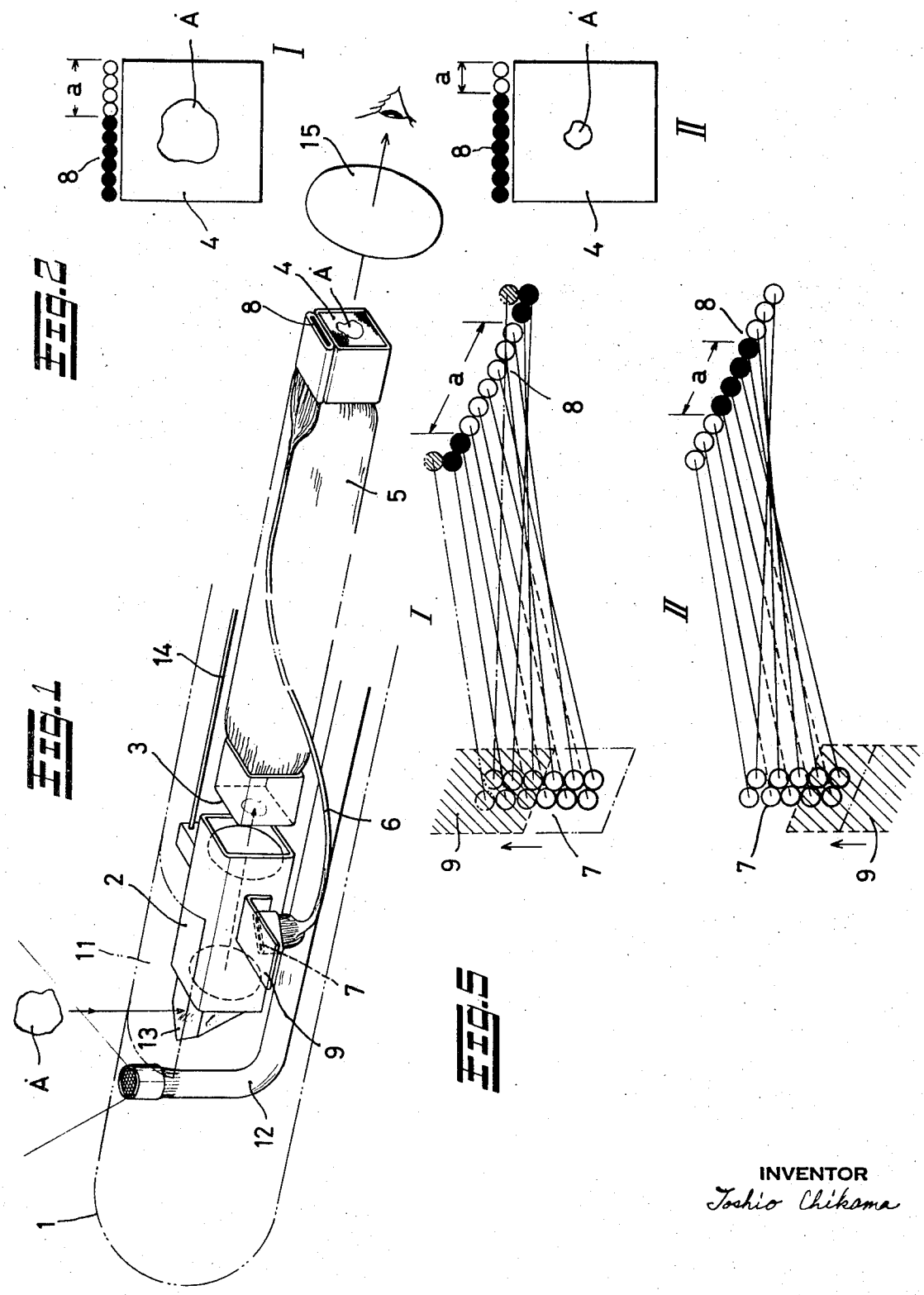

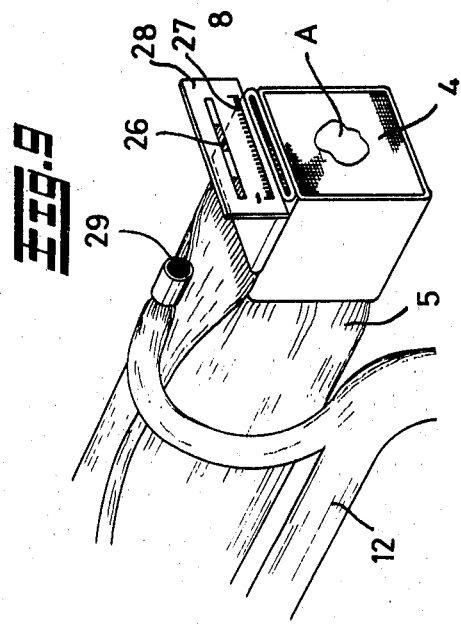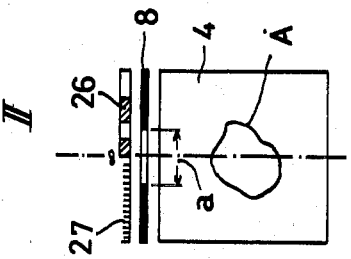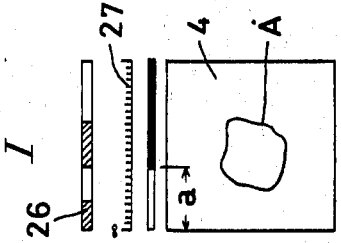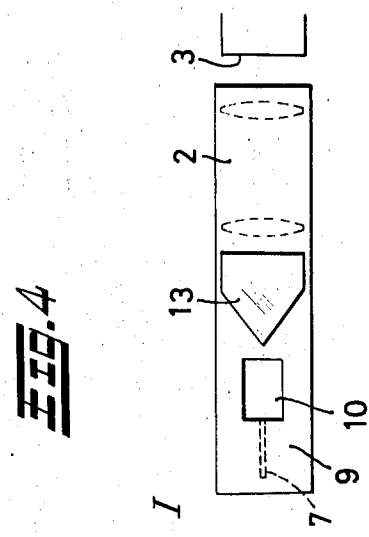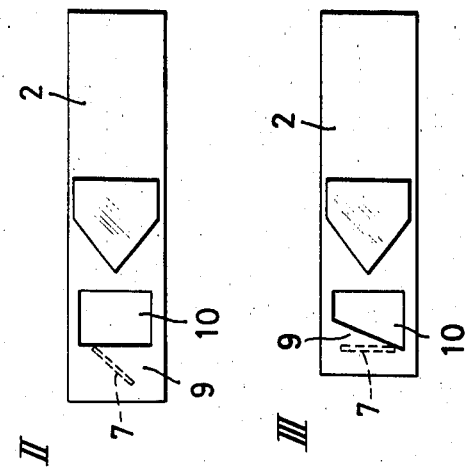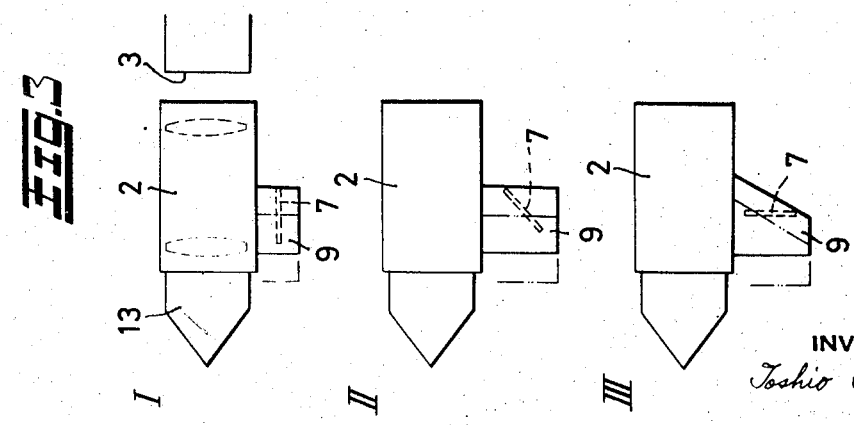

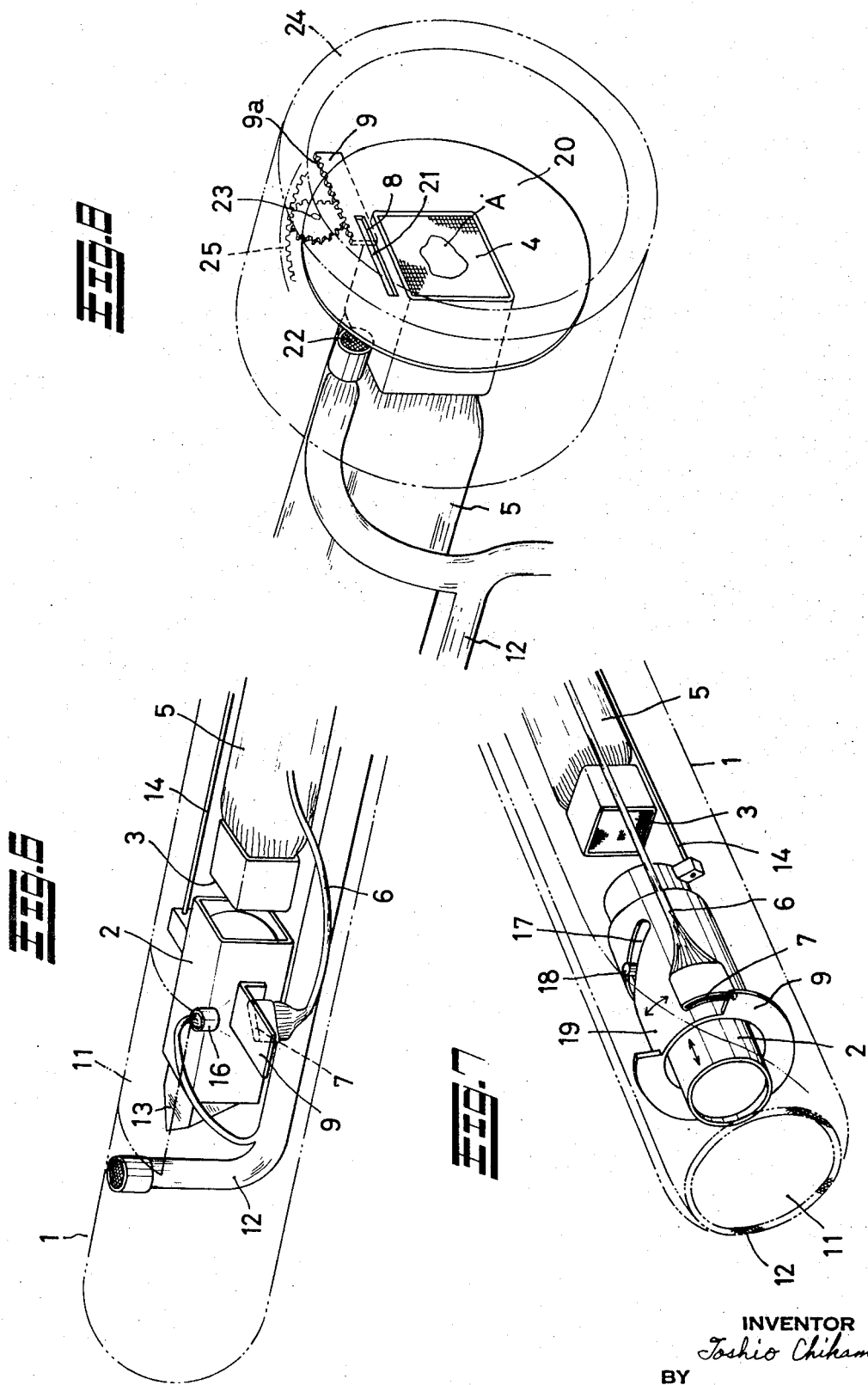

ENDOSCOPE PROVIDING AN IMAGE OF AN OBSERVED OBJECT AND A SCALE BY WHICH THE TRUE SIZE OF THE OBJECT CAN BE DETERMINED FROM THE IMAGE

BRIEF SUMMARY OF THE INVENTION

This invention relates to an endoscope and more particularly to apparatus in an endoscope by which the actual size of an observed object can be accurately determined from an image thereof appearing on an image viewing surface.

In accordance with the invention, a scale indicating means provides a length measurement proximate the image, and the actual size of the object can be determined by the relation of the size of the image to the size of the length measurement.

According to the invention the length measurement on the scale indicating means is proportionally varied in relation to relative movement of an object lens assembly and an image conducting member, said relative movement serving to focus the image of the object on the viewing surface of the image conducting member.

The length measurement may be indicated by an illuminated portion of a darkened scale or by a darkened portion of an illuminated scale. The length measurement is controlled by the movement of a shading plate in correspondence with said relative movement between the object lens assembly and the image conducting member.

In further accordance with the invention, an exposure scale for providing the necessary degree of exposure to photograph the object is placed adjacent the scale indicating means to furnish an exposure value for an indicated length measurement. A distance scale may also be placed adjacent the scale indicating means to furnish a value of the distance of the object from the endoscope for an indicated length measurement.

BRIEF DESCRIPTION OF THE DRAWING

FIG. 1 is a perspective view diagrammatically showing the principal elements of one embodiment according to this invention;

FIGS. 2 I and II respectively show an enlarged front view of an image receiving surface portion thereof;

FIGS. 3 and 4 are top plan views showing various examples of the relation between a light receiving surface and a shading plate;

FIGS. 5 I and II are perspective views showing two modified examples of the light receiving surface;

FIG. 6 is a perspective view showing a modified embodiment of an illuminating apparatus for the light receiving surface;

FIG. 7 is a perspective view diagrammatically showing the principal elements of another embodiment according to this invention;

FIG. 8 is a perspective view diagrammatically showing the principal elements of a further embodiment according to this invention;

FIG. 9 is a perspective view of the base portion of an endoscope showing apparatus for indicating degree of exposure and distance;

FIG. 10 I is an enlarged front view of an image viewing surface portion thereof; and FIG. 10 II is an enlarged front view of a modified version thereof.

DETAILED DESCRIPTION

Referring to FIG. 1 of the drawing, therein is shown an endoscope comprising a long slender cylindrical tube 1 adapted for insertion into a body cavity. The tube 1 contains, in known manner, an object lens housing 2 which is movable for focusing an image of an object A to be observed and located at any desired distance from tube 1. Behind the housing 2 is an image conducting rod 5 comprising a bundle of optical fibers and having a front end serving as an image receiving surface 3 and a rear end serving as an image viewing surface 4. Numeral 6 denotes a light conducting rod comprising a bundle of optical fibers similar to the foregoing image conducting rod 5, and the fiber ends of one end portion of the rod 6 are arranged in a straight line to form a light receiving surface 7, and the fiber ends of the other end portion thereof are arranged, in correspondence with the fiber arrangement in the light receiving surface 7, to form a standard scale indicating portion 8. The portion 8 is positioned in the same plane as the image viewing surface 4 of the image conducting rod 5.

Numeral 9 denotes a shading plate mounted in front of the light receiving surface 7 of the light conducting rod 6, and the plate 9 is formed either by a lateral projection on the side surface of the lens housing 2, as shown in FIGS. 1 and 3, or by extending a lower side plate of the lens housing 2 forwardly as shown in FIG. 4. In the latter case, the plate 9 is provided with an aperture 10 through which the light receiving surface 7 can be exposed.

In an endoscope of the type in which the object lens housing 2 is fixed within the cylindrical tube 1 and the image conducting rod 5 is arranged to move in relation thereto for focusing, the foregoing shading plate 9 is connected to move with the movement of the image conducting rod 5.

Numeral 11 denotes an observation window formed at the front portion of the cylindrical tube 1, and numeral 12 denotes a light conducting rod of optical fibers arranged to face a light source (not shown) at the base end portion of the cylindrical tube 1. The front end of the rod 12 is positioned near the observation window 11 for illuminating the object A. Numeral 13 denotes an objective prism, numeral 14 denotes an operation wire for moving the lens housing 2, and numeral 15 denotes an eyepiece.

In the case where, in the condition of FIG. 1, the object A is located at a close position and is to be observed, focusing is effected by moving the lens housing 2 forwards by means of the operation wire 14. Thereupon, the light receiving surface 7 is exposed from the shading plate 9 in proportion to the magnitude of movement of the lens housing 2, so that by entry of light in the exposed portion of the light receiving surface 7, a bright portion *a* of a length corresponding to the length of the exposed portion appears at the other end at indicating portion 8. At the same time, an image A′ appears on the image viewing surface 4. In the case where the object A is at a distant location and is to be observed, the amount of movement of the lens housing 2 to provide a sharp image of the object A will be less than that in the foregoing case, so that the exposed portion of the light receiving surface 7, that is, the bright portion *a* on the indicating portion 8 becomes smaller. The relation between the light receiving surface 7 and the shading plate 9 can be so modified that the light receiving surface 7 may be initially fully exposed to the light and then be gradually covered by the plate 9. It will be easily understood that, in this modified arrangement, the bright portion *a* will be replaced by a shaded portion and vice versa. In sum, the further away the object A, the smaller the length of the bright or shaded portion *a*. In this connection, it should be also considered that the further the distance of the object A, the smaller the size of the image A' of the object A appearing on the image viewing surface 4. Accordingly, it is possible to so construct the device that the length of the bright or shaded portion *a* on the indicating portion 8 always represents a standard length, for example, 10 mm in actual size. If so constructed, the actual size of the object A can be accurately estimated by comparing the size of the image A' appearing on the surface 4 with the length of the bright or shaded portion, that is, the standard scale *a*. If, for example, the size of the image A' is twice as large as the length of the standard scale *a*, it can be estimated that the actual size of the object A is 20 mm, in the case where the standard scale *a* is previously designed to correspond to 10 mm of actual size. By way of further example if an object A of the same size is twice as far from the objective prism 13, the image on the surface 4 may be half-sized but the length of scale *a* will also be half-size so that object A will still be twice as large as scale *a* and hence its actual size will still be indicated as 20 mm.

Note that regardless of the actual physical length of scale *a* it always represents the predetermined value (10 mm), and the actual size of object A is determined by comparison of the size of the image A' and the actual length of scale *a*.

In the case where the object lens is of such a focal length that the size of the image A' changes in linear proportion to the amount of movement of the lens, the light receiving surface 7 is disposed parallel with the axis of the lens housing 2 as shown in FIG. 3 I and FIG. 4. I. In the case where the object lens is of such a focal length that the rate of the change of the size of the image A' is larger than that of the amount of movement of the lens housing 2, the light receiving surface 7 and the shading plate 9 are arranged at a predetermined inclined relation as shown in FIG. 3 II, III and FIG. 4 II, III so that the size of the image A' will change in direct proportion to the change in the lighted or shaded portion of the scale *a*.

FIGS. 5 I and II each shows an embodiment of the light conducting rod 6 whereby the length of the standard scale *a* can be substantially changed by a slight movement of the lens housing 2 and the space for the light receiving surface 7 can be made smaller. Namely, in each example the rods of the light receiving surface 7 are formed in two rows having a smaller length than the indicating portion 8, so that by moving the shading plate 9 in the direction of the arrow, the bright or shaded portion *a* is indicated at the middle portion of the indicating portion 8. The standard scale *a* is indicated by a bright portion in FIG. 5 I, but the same scale is indicated by a shaded portion in FIG. 5 II. In the case where the standard scale *a* is indicated by the shaded portion as in FIG. 5 II, the maximum movement of the lens housing 2 can be determined to have been reached when the entire length of the indicating portion 8 has been shaded, i.e. all the bright rods have been darkened. However, in the case where the standard scale *a* is indicated by the bright portion as in FIG. 5 I, it is difficult to determine when the maximum movement of the lens housing 2 has been reached because the rods at the indicating portion 8 are successively illuminated. Accordingly, in the latter case, it is preferable that the opposite terminal ends of the indicating portion 8 are bent in one side direction as shown by dotted lines in FIG. 5 I, so that the end of movement of housing 2 can be easily determined when the brightness has reached these bent portions.

As for the light for illuminating the light receiving surface 7, the light rays entering the observing window 11 from the outside is used in the embodiment of FIG. 1. In FIG. 6 an embodiment is shown in which a light source 16 is positioned for illuminating the light receiving surface 7, said source 16 being formed by partly dividing the optical fiber bundle of the light guide rod 12.

The embodiment in FIG. 7 is of the type in which the front end of the cylindrical tube 1 is formed as the observing window 11. In this embodiment a forward and rearward movement of the lens housing 2 produces rotation of an outer tube 19, by engagement of a pin 18 on housing 2 in an inclined groove 17 in tube 19. The light receiving surface 7 is progressively shaded or exposed by the shading plate 9, the latter being formed as part of an annulus which is integral with the outer tube 19 as shown in FIG. 7. In this embodiment, the illumination of the light receiving surface 7 is effected by utilizing the light rays entering the front window 11 from outside and the illumination of the object A is effected by a light source comprising optical fibers 12 peripherally arranged around the edge of the window 11.

It is not always necessary that the light receiving surface 7 of the light conducting rod 6 be positioned at the front end of the cylindrical tube 1 as in the foregoing embodiments. In the case where the endoscope is of such a type that the lens housing 2 and the cylindrical tube 1 are integrally connected with one another and focusing is effected by moving the cylindrical tube 1 in relation to the image conducting rod 5, (not illustrated in the drawings) the shading plate 9 can move with the cylindrical tube 1 so that the light receiving surface 7 of the light conducting rod 6 can be positioned at the base end of the cylindrical tube 1.

In another embodiment as shown in FIG. 8 the standard scale indicator is not constituted as a light conducting rod 6 of optical fiber type. Namely, in FIG. 8, a face plate 20 provided on the periphery of the image viewing surface 4 of the image conducting rod 5 is provided with a slit opening 21, and the opening 21 is illuminated by a light source 22 so as to serve as the standard scale indicating portion 8, whereby it is possible to make the standard scale *a* correspond to a bright or shaded portion by opening or closing the opening 21 by movement of the shading plate 9 in accordance with the focusing operation in a similar manner as in the foregoing embodiments.

The shading plate 9 in this embodiment is formed at one edge with a rack 9a, and the plate 9 is moved by rotation of a pinion 23 in mesh with the rack 9a in accordance with the rotation of an internal gear 25 of an adjusting ring 24 for focusing the image.

In the embodiments mentioned above, the image conducting rod 5 comprises a bundle of optical fibers, but it will be readily understood that, instead thereof, an image conducting member comprising a conventional lens system can be used.

Thus, according to this invention, the standard scale indicating portion, wherein the length of the bright or shaded portion is changed by the movement of the shading plate in correspondence with the relative movement between the object lens housing and the image guide conducting member, is provided on the eyepiece side, so that the actual size of the object can be accurately estimated by comparing the size of the image of the object with the standard scale indication and thus the observation effect can be extremely improved.

Additionally, according to this invention, the exposure degree for photographing the object A and the distance of the object A can be indicated by utilizing the standard scale a indicated by the length of the bright or shaded portion. Namely, a photometer scale 26 and a distance scale 27 are provided along the length of the standard scale indicating portion 8 as shown in FIG. 9.

In the illustrated embodiment, the scales 26 and 27 are provided on a transparent or semi-transparent plate 28 and a light source 29 is mounted behind the plate for illuminating these scales. The exposure scale 26 is indicated by lines or colored zones.

In the case where the standard scale a extends from one end of the indicating portion 8, it is preferable that the two scales 26 and 27 be arranged above one another as shown in FIG. 10 I. In the case where the standard scale a extends from its center to the right and the left symmetrically, it is preferable that the two scales 26 and 27 be arranged to the right and the left as shown in FIG. 10 II. It is not always necessary that two scales 26 and 27 be provided, and either one of the two can be provided.

As mentioned before, the greater the distance of the object A from the objective 13, the smaller the length of the bright or shaded portion, that is, the standard scale a on the standard scale indicating portion 8. Accordingly, the distance of the object A can be evaluated from the length of the standard scale a, and the distance scale 27 is based on this principle.

It will be readily understood that the greater the distance of the object A, the smaller the intensity of the light on the object A, and the greater the exposure degree necessary for photographing. Additionally, the greater the distance of the object A, the smaller the length of the standard scale a, as mentioned before. Accordingly, the exposure degree necessary for photographing the object A can be estimated from the length of the standard scale a. The exposure scale 26 is based on this principle.

Thus, according to this invention, the distance of the object can be determined by reading the distance on scale 27 for the length of the standard scale a, and additionally the exposure degree can be determined by reading the value of the exposure scale for the length of the standard scale a.

What is claimed is:

1. An endoscope comprising an object lens assembly positioned to face an object to be observed to produce an image thereof, an image conducting member facing said object lens assembly to transmit said image to an image viewing surface of the conducting member, means for providing relative movement between said object lens assembly and said image conducting member to focus the image in said viewing surface, and scale indicating means adjacent said viewing surface and having a length measurement which varies in response to said relative movement, said scale indicating means serving as a measure of the true size of the object by comparison of the size of said image with said length measurement.

2. An endoscope as claimed in claim 1 wherein said length measurement of said scale indicating means is constituted by an illuminated portion.

3. An endoscope as claimed in claim 1 wherein said length measurement of said scale indicating means is constituted by a shaded portion of an illuminated length.

4. An endoscope as claimed in claim 1 wherein said scale indicating means comprises an elongated indicator, a shading plate adjacent said indicator, and means to move said shading plate in correspondence with said relative movement between the object lens assembly and said image conducting member to progressively vary exposure of said elongated indicator to light.

5. An endoscope as claimed in claim 4 comprising means to illuminate said indicator.

6. An endoscope as claimed in claim 4 wherein said shading plate progressively covers said indicator whereby said length measurement is constituted by a shaded part of the illuminated indicator.

7. An endoscope as claimed in claim 4 wherein said shading plate progressively exposes said indicator to light whereby said length measurement is constituted by an illuminated part of a non-illuminated indicator.

8. An endoscope as claimed in claim 4 comprising an exposure scale extending along the elongated indicator and correlated therewith to provide a measure of the degree of illumination of the object based on said length measurement.

9. An endoscope as claimed in claim 4 comprising a distance scale extending along the elongated indicator and correlated therewith to provide a measure of the distance of the object from said object lens assembly based on said length measurement.

10. An endoscope as claimed in claim 4 comprising an exposure scale extending along the elongated indicator and correlated therewith to provide a measure of the degree of illumination of the object based on said length measurement, a distance scale extending along the elongated indicator and correlated therewith to provide a measure of the distance of the object from said object lens assembly based on said length measurement.

* * * * *